(12) United States Patent
Barrois et al.

(10) Patent No.: US 8,379,969 B2
(45) Date of Patent: Feb. 19, 2013

(54) METHOD FOR MATCHING AN OBJECT MODEL TO A THREE-DIMENSIONAL POINT CLOUD

(75) Inventors: Bjoern Barrois, Neu-Ulm (DE); Lars Krueger, Ulm (DE); Christian Woehler, Heroldstatt (DE)

(73) Assignee: Pilz GmbH & Co. KG, Ostfildern (DE)

(*) Notice: Subject to any disclaimer, the term of this patent is extended or adjusted under 35 U.S.C. 154(b) by 160 days.

(21) Appl. No.: 12/756,611

(22) Filed: Apr. 8, 2010

(65) Prior Publication Data

US 2010/0310154 A1 Dec. 9, 2010

Related U.S. Application Data

(63) Continuation of application No. PCT/EP2008/008337, filed on Oct. 2, 2008.

(30) Foreign Application Priority Data

Oct. 9, 2007 (DE) .................. 10 2007 048 320

(51) Int. Cl.
*G06K 9/00* (2006.01)
*G06K 9/34* (2006.01)
*G06K 9/62* (2006.01)

(52) U.S. Cl. ........ 382/154; 382/173; 382/224; 382/225; 382/156; 382/157; 382/159

(58) Field of Classification Search .................. 382/154
See application file for complete search history.

(56) References Cited

U.S. PATENT DOCUMENTS

| 7,706,603 | B2* | 4/2010 | Najafi et al. ............. 382/154 |
| 7,929,775 | B2* | 4/2011 | Hager et al. ............. 382/224 |
| 2005/0286767 | A1* | 12/2005 | Hager et al. ............. 382/190 |

OTHER PUBLICATIONS

Hotta et al., "An Efficient Search Method Based on Dynamic Attention Map by Ising Model," Oct. 2005, IEICE TRANS. INF & SYSTE., vol. E88-D, pp. 2286-2295.*
Christian Wöhler et al., A Time Delay Neural network Algorithm for Estimating Image-pattern Shape and Motion, Apr. 1998, pp. 1-28.
Zhengyou Zhang, Interative Point Matching for Registration of Free-Form Curves, INRIA Technical Report No. 1658, Mar. 1992, pp. 1-42.

(Continued)

*Primary Examiner* — Vu Le
*Assistant Examiner* — Kenny Cese
(74) *Attorney, Agent, or Firm* — Harness, Dickey & Pierce, P.L.C.

(57) ABSTRACT

The invention relates to a method for matching an object model to a three-dimensional point cloud, wherein the point cloud is generated from two images by means of a stereo method and a clustering method is applied to the point cloud in order to identify points belonging to respectively one cluster, wherein model matching is subsequently carried out, with at least one object model being superposed on at least one cluster and an optimum position of the object model with respect to the cluster being determined, and wherein a correction of false assignments of points is carried out by means of the matched object model. A classifier, trained by means of at least one exemplary object, is used to generate an attention map from at least one of the images. A number and/or a location probability of at least one object, which is similar to the exemplary object, is determined in the image using the attention map, and the attention map is taken into account in the clustering method and/or in the model matching.

7 Claims, 1 Drawing Sheet

OTHER PUBLICATIONS

Joachim Schmidt et al., 3D Scene Segmentation and Object Tracking in Multiocular Image Sequences, 2007, 10 pages.

Masaru Tanaka et al., Dynamic Attention Map by Ising Model for Human Face Detection, 2008, 3 pages.

Heiko Hirschmüller, Accurate and Efficient Stereo Processing by Semi-Global Matching and Mutual Information, Jun. 2005, 8 pages.

Fuyuto Terui et al., Motion Estimation to a Failed Satellite on Orbit using Stereo Vision and 3D Model Matching, 2006, 8 pages.

M. Bertozzi et al., Stereo Vision-based Approaches for Pedestrian Detection, 2005, 7 pages.

Radu Bogdan Rusu et al., Towards 3D Object Maps for Autonomous Household Robots, Nov. 2, 2007, pp. 3191-3198.

* cited by examiner

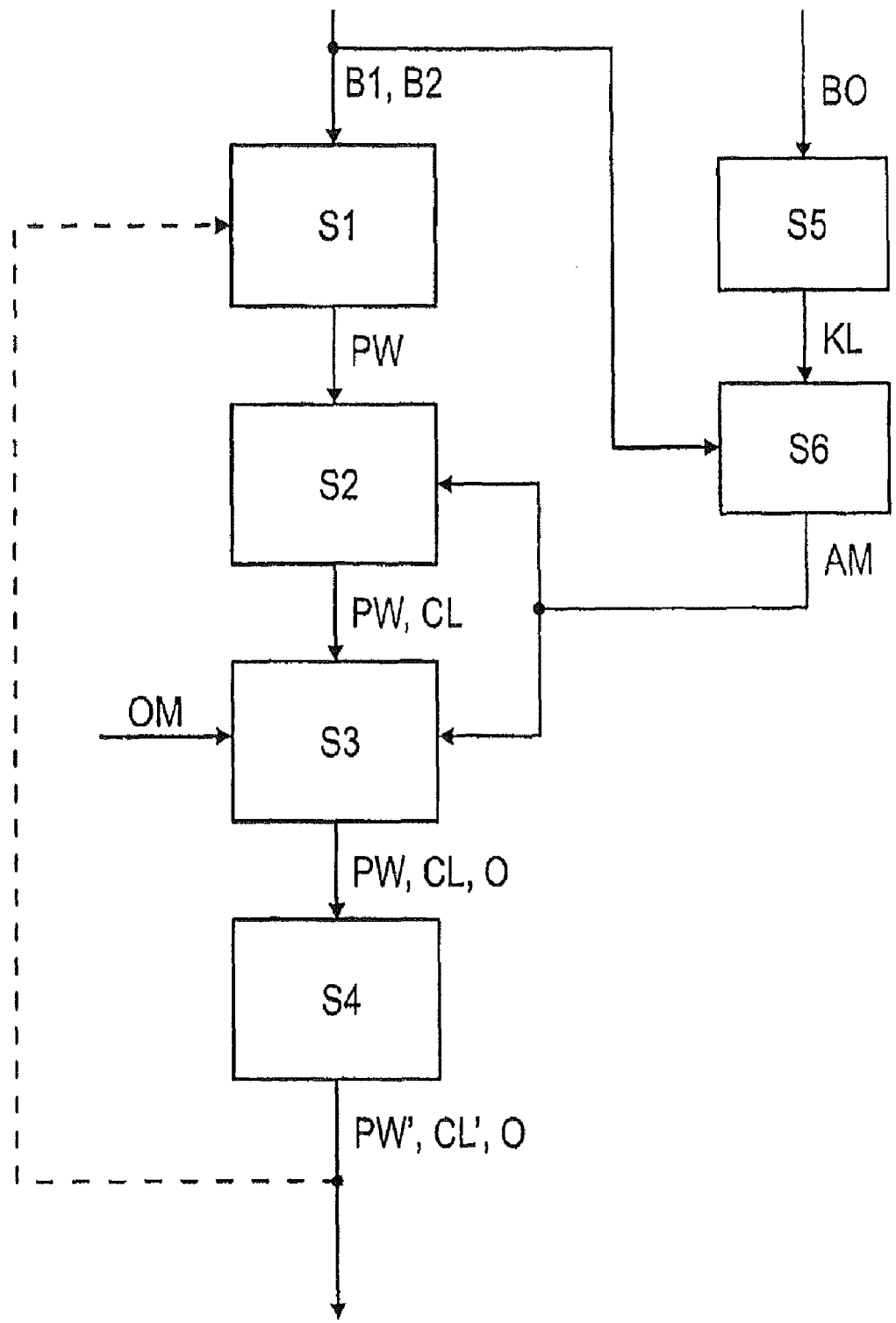

US 8,379,969 B2

METHOD FOR MATCHING AN OBJECT MODEL TO A THREE-DIMENSIONAL POINT CLOUD

CROSS REFERENCES TO RELATED APPLICATIONS

This application is a continuation of international patent application PCT/EP2008/008337 filed on Oct. 2, 2008 designating the U.S., which international patent application has been published in German language as WO 2009/049774 A1 and claims priority from German patent application DE 10 2007 048 320.3 filed on Oct. 9, 2007. The entire contents of these prior applications are incorporated herein by reference.

BACKGROUND OF THE INVENTION

The invention relates to a method for matching an object model to a three-dimensional point cloud, wherein the point cloud is generated from two images by means of a stereo method, and a clustering method is applied to the point cloud in order to identify points respectively belonging to one cluster, and wherein model matching is subsequently carried out.

Object models are used to identify objects and to determine the three-dimensional location thereof. When matching an object model to a three-dimensional point cloud, known methods [Schmidt, Wöhler, C., Krüger, L., Gövert, T., Hermes, C., 2007. 3D *Scene Segmentation and Object Tracking in Multiocular Image Sequences. Proc. Int. Conf on Computer Vision Systems (ICVS)*, Bielefeld, Germany] often result in ambiguity (false positive assignments). The object may be multiply found in the point cloud, even though it is not present that many times, or not present at all. A further problem relating to model matching is existing imprecision of the match. Currently conventional stereo methods are usually based on searching for features (edges, points, corners, blocks of pixels, etc.) in a left-hand and a right-hand image, and subsequently assigning identical/similar features to one another. Alternatively, it is often the case that the contents of local image windows are examined with regard to their similarity. The so-called disparity value is then determined by determining the offset of the assigned features or image windows in the left-hand and right-hand images with respect to one another. Assuming a calibrated camera system, a depth value can subsequently be assigned to the associated pixel from the disparity value by means of triangulation. False depth values occur in some cases as a result of a false assignment. In the case of edge-based stereo methods, this often occurs in repeating structures in the image, such as fingers on a hand, a forest, etc. The 3D points generated by the false assignment are referred to as false correspondences or outliers. Depending on the selection of features, this effect occurs more or less frequently, but can never be excluded generally without further assumptions. These false correspondences negatively influence the matching of the object model because they lead to a deterioration of the representation of the scene by the 3D point cloud.

The literature discloses various methods which deal with the problem of false correspondences. For the most part, the methods try to detect the outliers in order to subsequently eliminate them. A disadvantage in this case is the reduction in the number of 3D points, or the loss of information caused by this. Other methods [Hirschmuller, H, 2005. *Accurate and Efficient Stereo Processing by Semi-Global Matching and Mutual Information, Proc. IEEE Conf on Computer Vision and Pattern Recognition*, San Diego, USA] try to suppress the problem, for example by assuming sectionwise smooth surfaces. As a result of such smoothness assumptions, fine structures can no longer be detected and this leads to a loss of information. Moreover, these methods only produce good results in cases where smooth surfaces can actually be expected.

SUMMARY OF THE INVENTION

It is an object of the invention to provide an improved method for matching an object model to a three-dimensional point cloud.

According to an aspect of the invention, there is provided a method for matching an object model representing a real object to a three-dimensional point cloud comprising a plurality of three-dimensional points, the method comprising the steps of stereoscopically recording two images of an area comprising at least one real object, providing an object model representing the real object, providing a number of exemplary images showing an exemplary embodiment of the real object, training a classifier by means of the exemplary images, generating the three-dimensional point cloud from the two images by means of a stereo method, generating an attention map from at least one of the two images using the classifier, determining at least one cluster of points in the point cloud by applying a clustering method to the plurality of points, the at least one cluster representing points belonging to the real object, superimposing the object model on the at least one cluster, and correcting any false assignments of points to the at least one cluster by means of the superimposed object model, wherein a location probability for the at least one object in the images is determined using the attention map, and wherein an optimum position of the object model relative to the cluster is determined using the location probability.

According to another aspect, there is provided a method for matching an object model to a three-dimensional point cloud comprising a plurality of three-dimensional points, wherein the point cloud is generated from two images by means of a stereo method, wherein a classifier, trained by means of at least one exemplary object, is used to generate an attention map from at least one of the images, wherein a clustering method is applied to the point cloud in order to identify points respectively belonging to one cluster, wherein model matching is subsequently carried out, with at least one object model being superimposed on at least one cluster and an optimum position of the object model relative to the cluster being determined so as to provide a matched object model, and wherein false assignments of points to the cluster are corrected by means of the matched object model, with at least one from a number and a location probability of at least one object, which is similar to the exemplary object, is determined in the images using the attention map.

According to yet another aspect, there is provided a method for matching an object model to a three-dimensional point cloud, wherein the point cloud is generated from two images by means of a stereo method and a clustering method is applied to the point cloud in order to identify points respectively belonging to one cluster, wherein model matching is subsequently carried out, with at least one object model being superposed on at least one cluster and an optimum position of the object model with respect to the cluster being determined, wherein a correction of false assignments of points to the cluster is carried out by means of the object model, wherein a classifier, trained by means of at least one exemplary object, is used to generate an attention map from at least one of the images, wherein at least one from a number and a location probability of at least one object, which is similar to the exemplary object, in the image is determined using the attention map, and wherein the attention map is taken into account in at least one of the clustering method and the model matching.

Therefore, a point cloud is generated from two images by means of a stereo method, and a clustering method is applied to the point cloud in order to identify points respectively belonging to one cluster. Any stereo method can be used for generating the three-dimensional point cloud, in particular a space-time stereo method, as described in [Schmidt, J., Wöhler, C., Krüger, L., Gövert, T., Hermes, C. 2007. *3D Scene Segmentation and Object Tracking in Multiocular Image Sequences*. Proc. Int. Conf. On Computer Vision Systems (*ICVS*), Bielefeld, Germany]. This publication, which is incorporated herein by reference, also describes a clustering method which, for example, can advantageously be used in the new methods.

In clustering, points of the point cloud which are assumed to belong to the same object are grouped in what is called clusters.

Following the clustering, model matching takes place, with at least one object model being superimposed on at least one cluster and an optimum position of the object model with respect to the cluster being determined. Particularly, a model matching method can be used in this process as is described in [Zhang, Z., 1992. *Iterative Point Matching for Registration of Free-Form Curves, INRIA Technical Report* 1658], which is incorporated herein by reference.

As a result of the model matching, points erroneously or falsely assigned to a cluster can be identified and eliminated. Likewise, points erroneously lying outside of the considered cluster, either isolated or in a different cluster, which points are called outliers, can be identified as belonging to the cluster under consideration, and the assignment can be corrected accordingly.

Moreover, a probability map is generated from at least one of the two images, which probability map will be referred to as an attention map in the following, as it is typical in the literature. The generation of the attention map is described in detail in [Tanaka, M, Hotta, K, Kurita, T, Mishima, T, 2008. *Dynamic Attention Map by Ising Model for Human Face Detection, Int. Conf. On Pattern Recognition*, Brisbane, Australia]. This publication is also incorporated herein by reference. A classifier is used to generate the attention map, such as the TDNN described in [Wöhler, C., Anlauf, J. K., 1999. *A Time Delay Neural Network Algorithm for Estimating Image-pattern Shape and Motion, Image and Vision Computing* 17, pp. 281-294]. This publication is also incorporated herein by reference. This classifier is trained at first by using exemplary images of an exemplary object. The attention map allows to decide whether an object similar to the exemplary object is present in the scene, or how many of these objects are present in the scene. Moreover, the attention map allows to decide how likely it is that such an object is located at a specific location.

The attention map now is taken into account in a supporting role in the clustering method and/or in the model matching. In the case of the clustering method, the attention map is advantageously used to select suitable clusters for subsequent model matching. In the model matching, the attention map can advantageously be used to calculate an initial pose of the object model, starting from which the model matching is carried out. This improves convergence properties of the model matching. Good initialization of the model matching additionally avoids the problem of local minima, which can lead to a suboptimal match.

It is possible to perform a number of iterations of the new method, with a feedback loop to the stereo method after correcting the false assignments in order to improve the correspondence assignment for this location not only at the specific point, but also at further affected points, if any. In the process, a probability for the location of each point in the three-dimensional point cloud can be determined, because the point usually should be located on the surface of the object or cluster that is similar to the object model. In this manner, the formation of correspondences in the stereo method takes into account not only the similarity of image regions, but also the probability of the location, as a result of which the quality of the point cloud improves because there are less false assignments. For example, when observing fingers on a hand, the fingers being very similar to one another, there is a higher likelihood that a point is correctly assigned to the correct finger instead of an adjacent finger.

BRIEF DESCRIPTION OF THE DRAWING

In the following, an exemplary embodiment of the invention will be explained in more detail with reference to the drawing.

FIG. 1 shows a flowchart of an exemplary embodiment of the method according to the present invention for matching an object model to a three-dimensional point cloud. A list of reference symbols used in the drawing is given below:

AM Attention map or probability map
B1, B2 Image
BO Exemplary object
CL, CL' Cluster
O Object
OM Object model
PW, PW' Point cloud
S1 Stereo method
S2 Clustering method
S3 Model matching
S4 Correction of false assignments
S5 Training step
S6 Generation step of the attention map

DESCRIPTION OF PREFERRED EMBODIMENTS

FIG. 1 shows a flowchart of an exemplary embodiment of the method for matching an object model OM to a three-dimensional point cloud PW. First, two stereoscopically recorded images B1, B2 are supplied to a stereo method S1. The latter forms correspondence pairs from points of the two images B1, B2. The result is a three-dimensional point cloud PW. The point cloud PW is segmented using a clustering method S2, that is to say clusters CL with associated points are formed.

Following the clustering method S2, there is model matching S3, wherein at least one object model OM is superimposed on at least one cluster CL and an optimum position of the object model OM with respect to the cluster CL is determined.

By using the objects O, now identified in their position and pose, it is possible to identify and eliminate falsely assigned points of a cluster CL during a correction S4 of false assignments. Likewise, points, so-called outliers, which are erroneously lying outside of the considered cluster CL, either in isolation or in a different cluster CL, can be identified as belonging to the considered cluster CL, and the assignment is corrected accordingly, as a result of which a corrected point cloud PW' and corrected clusters CL' are generated.

The clustering method S2 and/or model matching S3 steps are supported by a probability map AM, which is referred to in the following text as an attention map AM in line with the convention of the literature.

The attention map AM is generated in a generation step S6 from at least one of the two images B1, B2. A classifier KL is used to generate the attention map AM. This classifier KL is trained beforehand using exemplary images of an exemplary object BO in a training step S5. The attention map AM allows to decide whether an object O similar to the exemplary object BO is located in the scene, or how many of these objects O are present in the scene. Moreover, the attention map AM affords the possibility of making a statement as to how likely it is that such an object O is located at a specific location.

In the clustering method S2, the attention map AM is used to select clusters CL suitable for the subsequent model matching S3. In the model matching S3, the attention map AM is particularly used to calculate an initial pose of the object model OM, starting from which the model matching S3 is undertaken.

It is possible to perform a number of iterations of the new method, as this is indicated by a dashed line, with a feedback loop to the stereo method S1 after correcting any false assignments S4.

What is claimed is:

1. A method for matching an object model representing a real object to a three-dimensional point cloud comprising a plurality of three-dimensional points, the method comprising the steps of:
   stereoscopically recording two images of an area comprising at least one real object,
   providing an object model representing the real object,
   providing a number of exemplary images showing an exemplary embodiment of the real object,
   training a classifier by means of the exemplary images,
   generating the three-dimensional point cloud from the two images by means of a stereo method,
   generating an attention map from at least one of the two images using the classifier,
   determining at least one cluster of points in the point cloud by applying a clustering method to the plurality of points, the at least one cluster representing points belonging to the real object,
   superimposing the object model on the at least one cluster, and
   correcting any false assignments of points in the at least one cluster by means of the superimposed object model,
   wherein a location probability for the at least one object in the images is determined from the cluster of points as corrected using the attention map, and
   wherein an optimum position of the object model relative to the cluster is determined using the location probability.

2. The method of claim 1, wherein an initial pose of the object model is determined using the attention map, the step of superimposing being carried out starting from the initial pose.

3. The method of claim 1, wherein a number of similar objects in the images is determined using the attention map, the number being used in the step of determining the at least one cluster.

4. The method of claim 1, wherein the steps of generating the three-dimensional point cloud, determining at least one cluster of points in the point cloud, superimposing the object model on the at least one cluster, and correcting any false assignments of points in the at least one cluster are iteratively repeated.

5. A method for matching an object model to a three-dimensional point cloud comprising a plurality of three-dimensional points,
   wherein the point cloud is generated from two images by means of a stereo method,
   wherein a classifier, trained by means of at least one exemplary object, is used to generate an attention map from at least one of the images,
   wherein a clustering method is applied to the point cloud in order to identify points respectively belonging to one cluster,
   wherein model matching is subsequently carried out, with at least one object model being superimposed on at least one cluster and an optimum position of the object model relative to the cluster being determined so as to provide a matched object model, and
   wherein false assignments of points in the cluster are corrected by means of the matched object model,
   with at least one from a number and a location probability of at least one object, which is similar to the exemplary object, is determined in the images from the cluster of points as corrected using the attention map.

6. The method of claim 5, wherein an initial pose of the at least one object model is determined using the attention map, the step of superimposing being carried out starting with the initial pose.

7. A method for matching an object model to a three-dimensional point cloud, wherein the point cloud is generated from two images by means of a stereo method and a clustering method is applied to the point cloud in order to identify points respectively belonging to one cluster, wherein model matching is subsequently carried out, with at least one object model being superposed on at least one cluster and an optimum position of the object model with respect to the cluster being determined, wherein a correction of false assignments of points in the cluster is carried out by means of the object model, wherein a classifier, trained by means of at least one exemplary object, is used to generate an attention map from at least one of the images, wherein at least one from a number and a location probability of at least one object, which is similar to the exemplary object, in the image is determined from the cluster of points as corrected using the attention map, and wherein the attention map is taken into account in at least one of the clustering method and the model matching.

* * * * *